United States Patent
Lu et al.

(10) Patent No.: US 11,165,710 B2
(45) Date of Patent: Nov. 2, 2021

(54) NETWORK DEVICE WITH LESS BUFFER PRESSURE

(71) Applicant: Huawei Technologies Co., Ltd., Shenzhen (CN)

(72) Inventors: Hui Lu, Shenzhen (CN); Wan Lam, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/785,990

(22) Filed: Feb. 10, 2020

(65) Prior Publication Data

US 2020/0177514 A1 Jun. 4, 2020

Related U.S. Application Data

(63) Continuation of application No. PCT/CN2018/087286, filed on May 17, 2018.

(51) Int. Cl.
| | |
|---|---|
| *H04L 12/835* | (2013.01) |
| *H04L 12/801* | (2013.01) |
| *H04L 12/823* | (2013.01) |
| *H04L 12/863* | (2013.01) |
| *H04L 12/861* | (2013.01) |

(52) U.S. Cl.
CPC ............ *H04L 47/30* (2013.01); *H04L 47/29* (2013.01); *H04L 47/32* (2013.01); *H04L 47/50* (2013.01); *H04L 49/9084* (2013.01)

(58) Field of Classification Search
CPC ......... H04L 47/30; H04L 47/29; H04L 47/32; H04L 47/50; H04L 49/9084; H04L 49/90; H04L 12/40
See application file for complete search history.

(56) References Cited

U.S. PATENT DOCUMENTS

| | | | |
|---|---|---|---|
| 6,532,214 B1 | 3/2003 | Rumsewicz | |
| 7,688,736 B1 | 3/2010 | Walsh | |
| 8,520,522 B1* | 8/2013 | Goldman | ................ H04L 47/26 370/235 |
| 2001/0050913 A1* | 12/2001 | Chen | ................... H04L 12/5602 370/360 |
| 2002/0118640 A1* | 8/2002 | Oberman | ................ H04L 49/25 370/230 |

(Continued)

FOREIGN PATENT DOCUMENTS

| | | |
|---|---|---|
| CN | 1905531 A | 1/2007 |
| CN | 102088412 A | 6/2011 |

(Continued)

*Primary Examiner* — Jael M Ulysse
(74) *Attorney, Agent, or Firm* — Conley Rose, P.C.

(57) ABSTRACT

A buffer module includes N queues configured to buffer M data streams, where N is less than M. A counting module includes M counters, the M counters are in a one-to-one correspondence with the M data streams, and the M counters are configured to count buffer quantities for the M data streams in the N queues. The control module is configured to, when a count value on a first counter exceeds a corresponding threshold, discard a to-be-enqueued data packet of a data stream corresponding to the first counter, or control the sending module to send pause indication information to an upper-level control module.

20 Claims, 2 Drawing Sheets

(56) References Cited

U.S. PATENT DOCUMENTS

| | | | | |
|---|---|---|---|---|
| 2002/0124102 | A1* | 9/2002 | Kramer | H04L 49/9078 709/234 |
| 2002/0141427 | A1* | 10/2002 | McAlpine | H04L 49/50 370/413 |
| 2002/0159385 | A1* | 10/2002 | Susnow | H04L 47/30 370/229 |
| 2002/0174279 | A1* | 11/2002 | Wynne | H04L 47/50 710/113 |
| 2004/0184444 | A1* | 9/2004 | Aimoto | H04L 47/32 370/352 |
| 2004/0260829 | A1* | 12/2004 | Husak | H04L 47/15 709/232 |
| 2005/0213504 | A1* | 9/2005 | Enomoto | H04L 47/20 370/235 |
| 2006/0067231 | A1* | 3/2006 | Ikoma | H04L 49/9078 370/235 |
| 2006/0256804 | A1* | 11/2006 | Kawarabata | H04W 72/1263 370/412 |
| 2009/0262748 | A1* | 10/2009 | Nakagawa | H04L 47/29 370/412 |
| 2011/0035487 | A1 | 2/2011 | Ouyang et al. | |
| 2013/0028082 | A1* | 1/2013 | Hata | H04L 47/6215 370/230 |
| 2013/0064544 | A1* | 3/2013 | Raponi | H04J 14/0257 398/58 |
| 2013/0091237 | A1* | 4/2013 | Arulambalam | G06F 3/0613 709/213 |
| 2013/0094858 | A1* | 4/2013 | Raponi | H04L 47/6275 398/59 |
| 2013/0170492 | A1* | 7/2013 | Lu | H04L 61/6022 370/390 |
| 2013/0315259 | A1* | 11/2013 | Boden | H04L 49/9084 370/412 |
| 2014/0269378 | A1* | 9/2014 | Holbrook | H01L 25/0657 370/252 |
| 2015/0058485 | A1* | 2/2015 | Chu | H04L 47/60 709/225 |
| 2015/0180799 | A1* | 6/2015 | Lovett | H04L 1/0041 370/355 |
| 2015/0222443 | A1* | 8/2015 | Basso | H04L 12/1881 370/230 |
| 2017/0195259 | A1* | 7/2017 | Florea | H04L 69/22 |
| 2017/0339062 | A1* | 11/2017 | Mayer-Wolf | H04L 47/12 |
| 2018/0006945 | A1* | 1/2018 | Flajslik | H04L 43/0888 |

FOREIGN PATENT DOCUMENTS

| | | |
|---|---|---|
| CN | 102413063 A | 4/2012 |
| CN | 103023806 A | 4/2013 |
| CN | 103763217 A | 4/2014 |
| CN | 103888377 A | 6/2014 |
| CN | 103929372 A | 7/2014 |
| CN | 105337896 A | 2/2016 |
| CN | 105812285 A | 7/2016 |
| CN | 106850714 A | 6/2017 |
| CN | 106941460 A | 7/2017 |

* cited by examiner

NETWORK DEVICE WITH LESS BUFFER PRESSURE

CROSS-REFERENCE TO RELATED APPLICATIONS

This application is a continuation of International Patent Application No. PCT/CN2018/087286, filed on May 17, 2018, which claims priority to Chinese Patent Application No. 201710680143.5, filed on Aug. 10, 2017, both of which are hereby incorporated by reference in their entireties.

TECHNICAL FIELD

This application relates to the field of communications technologies, and in particular, to a network device.

BACKGROUND

The Internet provides a data transmission channel between network devices. Each data sequence transmitted between network devices may be referred to as a data stream. The network device may be a switch, a router, a switching chip, or the like.

In other approaches, a network device allocates different queues to different data streams. For example, the network device allocates different queues to data streams transmitted to other different network devices or allocates different queues to data streams in different services. Each queue occupies a fixed available space, and when a space of one queue is used up, other queues still have a sufficient space for use. As a network speed rapidly increases, a quantity of data streams in the network device is also increased rapidly. To isolate different data streams to avoid them from affecting each other, a quantity of required queues is also sharply increased. However, on one hand, a queue is usually in a form of a linked list, and a larger quantity of queues leads to higher logical complexity of the linked list. This causes excessively high resource consumption of the network device. On the other hand, a sharp increase in the quantity of queues poses a greater challenge to buffering in the network device.

SUMMARY

This application provides a network device. On one hand, resource consumption of the network device can be reduced. On the other hand, buffer pressure of the network device can be released.

This application provides a network device, including a buffer module, a counting module, a control module, and a sending module. The buffer module includes N queues configured to buffer M data streams, where N is less than M. The counting module includes M counters, the M counters are in a one-to-one correspondence with the M data streams, and the M counters are configured to count buffer quantities for the M data streams in the N queues. The control module is configured to, when a count value on a first counter exceeds a corresponding threshold, discard a to-be-enqueued data packet of a data stream corresponding to the first counter, or control the sending module to send pause indication information to an upper-level control module, where the pause indication information is used to instruct the upper-level control module to pause data packet sending. The first counter is any one of the M counters.

In an embodiment, once the count value on the first counter exceeds the corresponding threshold, the to-be-enqueued data packet of the data stream corresponding to the first counter is discarded, or the sending module is controlled to send the pause indication information to the upper-level control module. On one hand, resource consumption of the network device can be reduced. On the other hand, buffer pressure of the network device can be released.

Optionally, the control module is further configured to, when the count value on the first counter is less than the corresponding threshold, insert the to-be-enqueued data packet into a corresponding queue, and control the first counter to update the count value.

Optionally, the first counter is further configured to calculate a weighted average value of the count value and a length of the to-be-enqueued data packet, to obtain an updated count value on the first counter.

In an embodiment, the network device can accurately update a count value on each counter, to accurately determine whether the count value on each counter is less than a corresponding threshold in order to determine whether to discard a to-be-enqueued data packet or send pause indication information to an upper-level control module.

Optionally, the control module is further configured to schedule a data packet in any queue, and control a second counter corresponding to the scheduled data packet to update a count value.

Optionally, the second counter is further configured to calculate a difference between the count value on the second counter and a length of the scheduled data packet, to obtain an updated count value on the second counter.

Optionally, the N queues are N input queues, and the M data streams are M input data streams. Correspondingly, the control module is further configured to set the N input queues based on a quantity of input ports of the network device and a maximum quantity of queues that corresponds to each input port.

Optionally, the control module is further configured to determine a maximum quantity M of input data streams based on a quantity of users that corresponds to each input port and a maximum quantity of data streams that corresponds to each user, and group input data packets into the M input data streams.

In this application, the network device serving as a lower-level network device can accurately set the input queues and the number of input data streams M.

Optionally, the N queues are N output queues, and the M data streams are M output data streams. Correspondingly, the control module is further configured to set the N output queues based on a quantity of lower-level network devices.

Optionally, the control module is further configured to determine a maximum quantity M of output data streams based on the quantity of lower-level network devices, a maximum quantity of input ports of each lower-level network device, and a maximum quantity of data streams that corresponds to each input port of the lower-level network device, and group output data packets into the M output data streams.

In this application, the network device serving as an upper-level network device can accurately set the output queues and the number of output data streams M.

This application provides a network device, including a buffer module, a counting module, a control module, and a sending module. The buffer module includes N queues configured to buffer M data streams, where N is less than M. The counting module includes M counters, the M counters are in a one-to-one correspondence with the M data streams, and the M counters are configured to count buffer quantities for the M data streams in the N queues. The control module is configured to, when a count value on a first counter exceeds a corresponding threshold, discard a to-be-enqueued data packet of a data stream corresponding to the first counter, or control the sending module to send pause indication information to an upper-level control module. It is not common that there are a huge quantity of data streams at a same moment. Therefore, in this application, in this case, it is proper to set a quantity of queues to be less than the quantity of data streams. Because the quantity of queues included in the network device provided in this application is few, resource consumption of the network device can be reduced, and buffer pressure of the network device can be released. For a short-time burst, that is, when there are a huge quantity of data streams at a same moment, once a count value on a counter exceeds a corresponding threshold, the control module discards a to-be-enqueued data packet of a data stream corresponding to the counter, or controls the sending module to send pause indication information to an upper-level control module. Based on this, the network device can buffer the M data streams through the N queues, thereby reducing resource consumption of the network device and releasing buffer pressure of the network device.

DESCRIPTION OF EMBODIMENTS

This application provides a network device. The network device may be a switch, a router, a switching chip, or the like.

Figure 1:
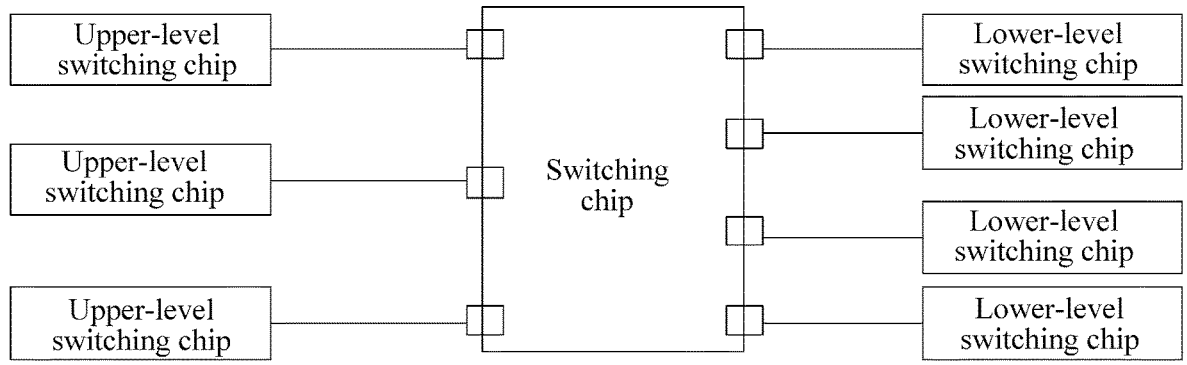
FIG. 1 is an application scenario diagram according to an embodiment of this application.

The switching chip is used as an example. FIG. 1 is an application scenario diagram according to an embodiment of this application. As shown in FIG. 1, one switching chip may have at least one upper-level switching chip and at least one lower-level switching chip. The switching chip may serve as both an upper-level switching chip and a lower-level switching chip. When the switching chip serves as an upper-level switching chip, the upper-level switching chip sends a data packet to a lower-level switching chip of the upper-level switching chip through an output port. When the switching chip serves as a lower-level switching chip, the lower-level switching chip receives, through an input port, a data packet sent by an upper-level switching chip of the lower-level switching chip. When the switching chip serves as an upper-level switching chip, the upper-level switching chip needs to set a queue used to store a to-be-sent data stream. The queue used to store the to-be-sent data stream is referred to as an output queue. When the switching chip serves as a lower-level switching chip, the lower-level switching chip needs to set a queue used to store a received data stream. The queue used to store the received data stream is referred to as an input queue.

Similarly, a switch may serve as both an upper-level switch and a lower-level switch. When the switch serves as an upper-level switch, the upper-level switch sends a data packet to a lower-level switch through an output port. When the switch serves as a lower-level switch, the lower-level switch receives, through an input port, a data packet sent by an upper-level switch of the lower-level switch. When the switch serves as an upper-level switch, the upper-level switch needs to set an output queue. When the switch serves as a lower-level switch, the lower-level switch needs to set an input queue.

Similarly, a router may serve as both an upper-level router and a lower-level router. When the router serves as an upper-level router, the upper-level router sends a data packet to a lower-level router through an output port. When the router serves as a lower-level router, the lower-level router receives, through an input port, a data packet sent by an upper-level router of the lower-level router. When the router serves as an upper-level router, the upper-level router needs to set an output queue. When the router serves as a lower-level router, the lower-level router needs to set an input queue.

This application provides a network device to resolve the following technical problems in other approaches. On one hand, a queue is usually in a form of a linked list, and a larger quantity of queues leads to higher logical complexity of the linked list. This causes excessively high resource consumption of the network device. On the other hand, a sharp increase in the quantity of queues poses a greater challenge to buffering in the network device. The queue may be the input queue or the output queue described above.

Figure 2:
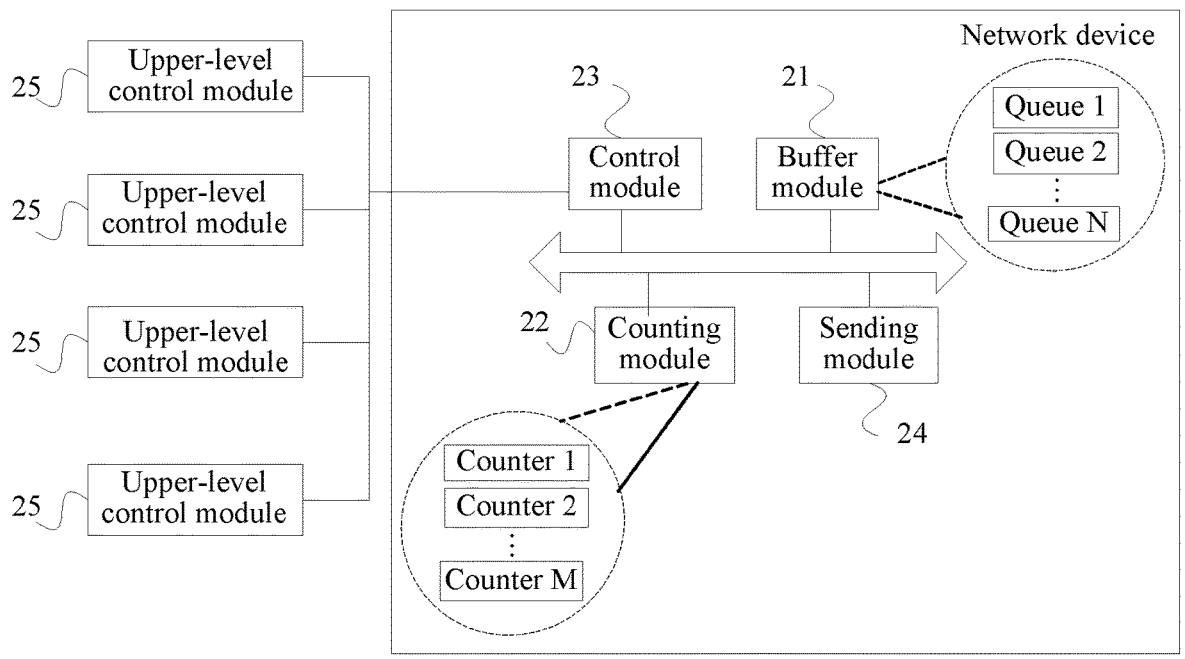
FIG. 2 is a schematic structural diagram of a network device according to an embodiment of this application.

Specifically, FIG. 2 is a schematic structural diagram of a network device according to an embodiment of this application. As shown in FIG. 2, the network device includes a buffer module 21, a counting module 22, a control module 23, and a sending module 24. The buffer module 21 includes N queues configured to buffer M data streams, where N is less than M. The counting module 22 includes M counters, the M counters are in a one-to-one correspondence with the M data streams, and the M counters are configured to count buffer quantities for the M data streams in the N queues. The control module 23 is configured to, when a count value on a first counter exceeds a corresponding threshold, discard a to-be-enqueued data packet of a data stream corresponding to the first counter, or control the sending module 24 to send pause indication information to an upper-level control module 25, where the pause indication information is used to instruct the upper-level control module 25 to pause data packet sending. The first counter is any one of the M counters.

The N queues may be N input queues. Correspondingly, the M data streams are M input data streams. In this case, the network device may be understood as a lower-level network device. The N queues may be N output queues. Correspondingly, the M data streams are M output data streams. In this case, the network device may be understood as an upper-level network device.

Optionally, the M counters are not fixedly allocated to the data streams, but are dynamically allocated to the data streams. A specific dynamic allocation algorithm may be any dynamic allocation algorithm in other approaches, provided that the M counters are in a one-to-one correspondence with the M data streams. This application is not limited thereto.

Each of the M counters is configured to count a buffer quantity for a corresponding data stream in a queue corresponding to the data stream. For example, a buffer quantity for a data stream B in a queue Q counted by a counter A is a length of the data stream B. When a data packet C is added to the data stream B, the buffer quantity for the data stream B in the queue Q counted by the counter A is a sum of the length of the data stream B and a length of the data packet C. Alternatively, when a data packet C is added to the data stream B, the buffer quantity for the data stream B in the queue Q counted by the counter A is a weighted average value of the length of the data stream B and a length of the data packet C. Alternatively, the buffer quantity for the data stream B in the queue Q counted by the counter A is a quantity of data packets included in the data stream B. Each counter has a corresponding threshold. Corresponding thresholds of the M counters may be the same or different.

The upper-level control module 25 and the control module 23 may belong to a same network device or belong to different network devices. For example, the upper-level control module 25 and the control module 23 may be two control modules belonging to a same switching chip, or the upper-level control module 25 and the control module 23 may belong to different switching chips. This application is not limited thereto. In FIG. 1, that the upper-level control module 25 and the control module 23 belong to different network devices is used as an example.

Optionally, the buffer module 21 may be a buffer, and the buffer may be a buffer in a random access memory (RAM), a memory module, an integrated circuit, or the like. This embodiment of this application is not limited thereto.

The control module 23 may be an integrated circuit in a switching chip, a processor or a controller in a switch, a processor or a controller in a router, or the like. The control module 23 may be connected to the buffer module 21, the counting module 22, and the sending module 24 using a controller area network (CAN) bus. In addition, the control module 23 may be connected to the upper-level control module or a lower-level control module using a public interface or a private interface, thereby communicating with the upper-level control module and the lower-level control module. The public interface may be an Ethernet (Ethernet) interface or the like, and the private interface may be a source-based (Cell-based) interface or the like.

The sending module 24 may be an integrated circuit in a switching chip, a transmitter in a switch, a transmitter in a router, or the like.

Figure 3:
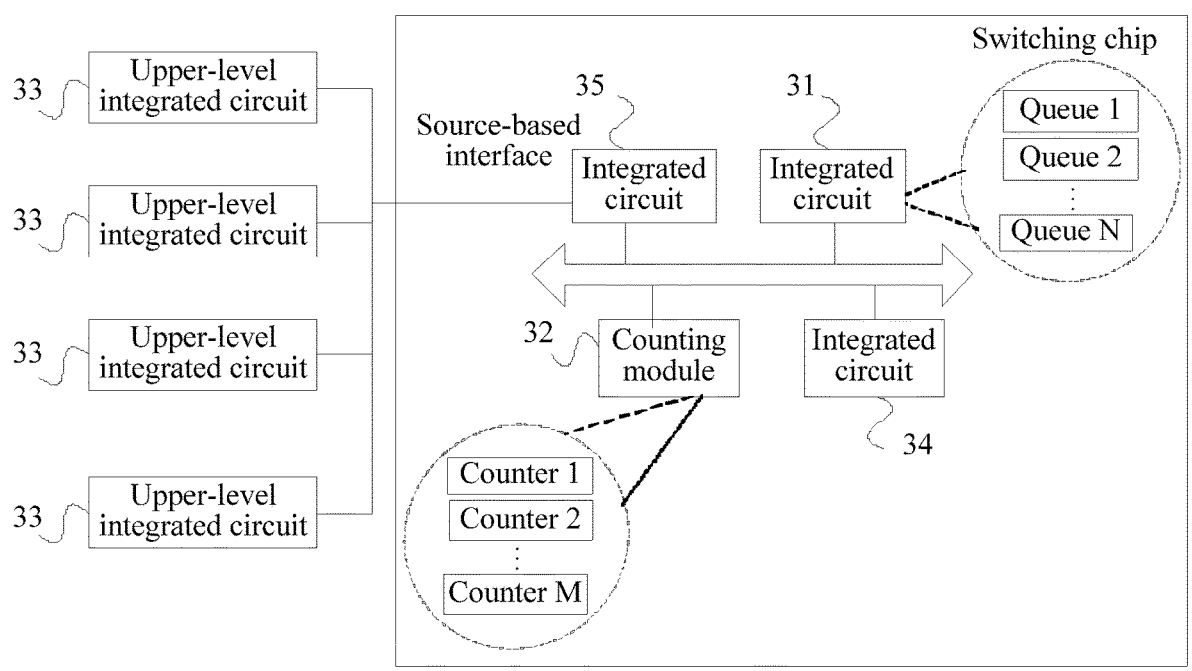
FIG. 3 is a schematic structural diagram of a network device according to an embodiment of this application.

For example, FIG. 3 is a schematic structural diagram of a network device according to an embodiment of this application. As shown in FIG. 3, it is assumed that the network device is a switching chip. The current level of switching chip has a plurality of upper-level switching chips. Each switching chip includes an integrated circuit 31 configured to buffer a queue, a counting module 32 including M counters, an integrated circuit 34 configured to send pause indication information to an upper-level integrated circuit 33 (corresponding to the foregoing upper-level control module), and an integrated circuit 35 configured to discard a to-be-enqueued data packet or configured to control the integrated circuit 34 to send the pause indication information to the upper-level integrated circuit 33.

The integrated circuit 31 includes N queues configured to buffer M data streams, where N is less than M. The counting module 32 includes M counters 321, the M counters 321 are in a one-to-one correspondence with the M data streams, and the M counters 321 are configured to count buffer quantities for the M data streams in the N queues.

The integrated circuit 35 may be connected to the integrated circuit 31, the counting module 32, and the integrated circuit 34 using a CAN bus. The integrated circuit 35 is connected to the upper-level integrated circuit 33 using a source-based (Cell-based) interface.

Further, as a network speed rapidly increases, a quantity of data streams in the network device is also increased rapidly. However, it is not common that there are a huge quantity of data streams at a same moment. Particularly, for a data center, a switch is under light load in most time, and a burst occurs only for a short time. Therefore, in this application, in this case, it is proper to set a quantity of queues to be less than the quantity of data streams. In addition, because there are few queues, resource consumption of the network device can be reduced, and buffer pressure of the network device can be released.

For a short-time burst, that is, when there are a huge quantity of data streams at a same moment, the control module of the network device can determine, depending on whether a count value on a counter exceeds a corresponding threshold, whether to send pause indication information to the upper-level control module or discard a to-be-enqueued data packet. Once a count value on a counter exceeds a corresponding threshold, the control module discards a to-be-enqueued data packet of a data stream corresponding to the counter, or controls the sending module to send pause indication information to the upper-level control module. Sending the pause indication information to the upper-level control module embodies a hierarchical queue management mechanism. Usually, the control module has a plurality of upper-level control modules. Based on the hierarchical queue management mechanism, the plurality of upper-level control modules are enabled to share buffer pressure of the current level of control module. In conclusion, this application is applicable not only to a case in which a quantity of data streams is normal, but also to a case in which there are a huge quantity of data streams at a same moment. According to the network device provided in this application, on one hand, resource consumption of the network device can be reduced, and on the other hand, buffer pressure of the network device can be released.

In conclusion, this application provides the network device, including the buffer module, the counting module, the control module, and the sending module. The buffer module includes the N queues configured to buffer the M data streams, where N is less than M. The counting module includes the M counters, the M counters are in a one-to-one correspondence with the M data streams, and the M counters are configured to count buffer quantities for the M data streams in the N queues. The control module is configured to, when the count value on the first counter exceeds the corresponding threshold, discard a to-be-enqueued data packet of a data stream corresponding to the first counter, or control the sending module to send pause indication information to the upper-level control module. On one hand, resource consumption of the network device can be reduced. On the other hand, buffer pressure of the network device can be released. Further, that the sending module sends pause indication information to the upper-level control module can be understood as a hierarchical implementation. When a plurality of upper-level network devices output data streams to the current level of network device, and congestion occurs in the current level of network device, the upper-level control module is caused, through the hierarchical implementation, to pause data packet sending. That is, the plurality of upper-level network devices can share congestion pressure of the current level of network device.

Optionally, the control module 23 is further configured to, when the count value on the first counter is less than the corresponding threshold, insert the to-be-enqueued data packet into a corresponding queue, and control the first counter to update the count value.

Optionally, the first counter is further configured to calculate a weighted average value of the count value and a length of the to-be-enqueued data packet, to obtain an updated count value on the first counter.

For example, the first counter $C_1$ may update a count value using the following formula $$C_{1\_new} = (1-\alpha) \times C_{1\_old} + \alpha \times \text{packet 1\_length}$$

where α is a smoothing factor, 0≤α≤1, $C_{1\_old}$ represents the count value before the update by the first counter $C_1$, $C_{1\_new}$ represents a count value after the update by the first counter $C_1$, and packet 1_length represents a length of a to-be-enqueued data packet.

Alternatively, the first counter may directly calculate a sum of the count value and a length of the to-be-enqueued data packet, to obtain an updated count value on the first counter. This application imposes no limitation on a method for calculating the updated count value.

The network device can accurately update a count value on each counter, to accurately determine whether the count value on each counter is less than a corresponding threshold in order to determine whether to discard a to-be-enqueued data packet or send pause indication information to the upper-level control module.

Optionally, the control module 23 is further configured to schedule a data packet in any queue, and control a second counter corresponding to the scheduled data packet to update a count value.

Optionally, the second counter is further configured to calculate a difference between the count value on the second counter and a length of the scheduled data packet, to obtain an updated count value on the second counter.

The second counter may be none of the M counters. That is, the second counter and the M counters are disposed independently. In this case, the count value on the second counter and count values on the M counters are not mutually affected. The second counter may be any one of the M counters. For example, the second counter is the first counter. In this case, the count value on the first counter changes with scheduling of a data packet. For example, a current count value on the first counter $C_1$ is $C_{1\_new}$. When the scheduled data packet corresponds to the first counter $C_1$, $C_{1\_new'}=C_{1\_new}-\text{packet 2\_length}$, where $C_{1\_new'}$ represents a count value updated by the first counter $C_1$ based on the scheduled data packet, and packet 2_length represents a length of the scheduled data packet.

Optionally, when the N queues are N input queues and the M data streams are M input data streams, the control module 23 is further configured to set the N input queues based on a quantity of input ports of the network device and a maximum quantity of queues that corresponds to each input port.

Optionally, when the N queues are N input queues and the M data streams are M input data streams, the control module 23 is further configured to determine a maximum quantity M of input data streams based on a quantity of users that corresponds to each input port and a maximum quantity of data streams that corresponds to each user, and group input data packets into the M input data streams.

Specifically, when the N queues are N input queues and the M data streams are M input data streams, it represents that the network device currently serves as a lower-level network device. In this case, the control module 23 may set the N input queues based on the quantity of input ports of the network device and the maximum quantity of queues that corresponds to each input port. Maximum quantities of queues that correspond to the input ports may be the same or different. It is assumed that a quantity of input ports of the network device is 5. Maximum quantities of queues of the input ports are the same, and each are 10. It is calculated that a product of the quantity of input ports of the network device and the maximum quantity of queues of each input port is 50. Based on this, the control module 23 may set 50 input queues.

Further, quantities of users that correspond to the input ports may be the same or different. Maximum quantities of data streams that correspond to the users may also be the same or different. It is assumed that the quantities of users that correspond to the input ports each are 100, and the maximum quantities of data streams that correspond to the users each are 5. In this case, a product of the quantity of users that corresponds to each input port and a maximum quantity of data streams that corresponds to each user is calculated to determine that the maximum quantity M of input data streams is 500.

Optionally, when the N queues are N output queues and the M data streams are M output data streams, the control module 23 is further configured to set the N output queues based on a quantity of lower-level network devices.

Optionally, when the N queues are N output queues and the M data streams are M output data streams, the control module 23 is further configured to determine a maximum quantity M of output data streams based on the quantity of lower-level network devices, a maximum quantity of input ports of each lower-level network device, and a maximum quantity of data streams that corresponds to each input port of the lower-level network device, and group output data packets into the M output data streams.

Specifically, when the N queues are N output queues and the M data streams are M output data streams, it represents that the network device currently serves as an upper-level network device. In this case, the control module 23 may set the N output queues based on the quantity of lower-level network devices. For example, the quantity of lower-level network devices of the control module is 10. Based on this, the control module 23 may set 10 output queues. That is, a quantity of output queues is the same as the quantity of lower-level network devices. The control module 23 may further set the N output queues based on the quantity of lower-level network devices and an adjustment factor. The adjustment factor is a positive integer greater than 1. For example, if the quantity of lower-level network devices of the control module is 10, and the adjustment factor is 3, the control module 23 may calculate a product of the quantity 10 of the lower-level network devices and the adjustment factor 3, to obtain that N is 30. Therefore, the control module 23 may set 30 output queues.

Further, maximum quantities of input ports of the lower-level network devices may be the same or different, and maximum quantities of data streams that correspond to the input ports of the lower-level network devices may be the same or different. It is assumed that the quantity of lower-level network devices of the network device is 10, the maximum quantity of input ports of each lower-level network device is 3, and the maximum quantity of data streams that corresponds to each input port is 10. In this case, a product of the quantity of lower-level network devices, the maximum quantity of input ports of each lower-level network device, and the maximum quantity of data streams that corresponds to each input port is calculated, to obtain that the maximum quantity M of the output data streams is 300.

It should be noted that criteria of grouping data streams when the network device serves as an upper-level network device and serves as a lower-level network device in this application may be different. For example, the data streams may be grouped based on a lower-level network device and an input port of the lower-level network device when the network device serves as an upper-level network device. For example, the data streams may be grouped based on a quantity of lower-level network devices and input ports of the lower-level network devices when the network device serves as an upper-level network device. The data streams may be grouped based on a quintuple when the network device serves as a lower-level network device. The quintuple includes a source Internet (Internet Protocol, IP for short) address, a source port, a destination IP address, a destination port, and a transport layer protocol. Alternatively, the data streams may be grouped based on a quintuple when the network device serves as an upper-level network device. The data streams may be grouped based on a quantity of upper-level network devices and output ports of the upper-level network devices when the network device serves as a lower-level network device.

In conclusion, in this application, the network device serving as a lower-level network device can accurately set the input queues and the M input data streams. The network device serving as an upper-level network device can accurately set the output queues and the number of output data streams M.

What is claimed is:

1. A network device, comprising:
   a buffer comprising N queues configured to buffer M data streams, wherein N is less than M;
   a counter coupled to the buffer and comprising M counters, wherein the M counters are in a one-to-one correspondence with the M data streams, and wherein the M counters are configured to count buffer quantities for the M data streams in the N queues;
   a transmitter coupled to the buffer; and
   a controller coupled to the transmitter and is configured to
      control the transmitter to send pause indication information to an upper-level controller when a count value on a first counter exceeds a corresponding threshold, wherein the pause indication information instructs the upper-level controller to pause data packet sending, and wherein the first counter is any one of the M counters;
      schedule a data packet in any queue; and
      control a second counter corresponding to the data packet to update a count value on the second counter, wherein the second counter is configured to calculate a difference between the count value on the second counter and a length of the data packet to obtain an updated count value on the second counter.

2. The network device of claim 1, wherein the controller is further configured to insert a to-be-enqueued data packet into a corresponding queue and control the first counter to update the count value on the first counter when the count value on the first counter is less than the corresponding threshold.

3. The network device of claim 1, wherein the first counter is further configured to calculate a weighted average value of the count value on the first counter and a length of a to-be-enqueued data packet to obtain an updated count value on the first counter.

4. The network device of claim 1, wherein the N queues are N input queues, wherein the M data streams are M input data streams, and wherein the controller is further configured to set the N input queues based on a plurality of input ports of the network device and a maximum quantity of queues that corresponds to each of the input ports.

5. The network device of claim 4, wherein the controller is further configured to:
   determine a maximum quantity M of input data streams based on a quantity of users that corresponds to each of the input ports;
   determine a maximum quantity of data streams that corresponds to each of the users; and
   group input data packets into the M input data streams.

6. The network device of claim 1, wherein the N queues are N output queues, wherein the M data streams are M output data streams, wherein the controller is further configured to set the N output queues based on a quantity of lower-level network devices.

7. The network device of claim 6, wherein the controller is further configured to:
   determine a maximum quantity M of output data streams based on the quantity of lower-level network devices;
   determine a maximum quantity of input ports of each of the lower-level network devices;
   determine a maximum quantity of data streams that corresponds to each of the input ports of the lower-level network device; and
   group output data packets into the M output data streams.

8. The network device of claim 1, wherein the network device is a switching chip.

9. The network device of claim 1, wherein the network device is a switch.

10. The network device of claim 1, wherein the N queues are N input queues, wherein the M data streams are M input data streams.

11. The network device of claim 1, wherein the second counter is one of the M counters.

12. A method, implemented by a network device, comprising:
   buffering M data streams, wherein the network device comprises N queues in a buffer, and wherein N is less than M;
   counting buffer quantities for M data streams in the N queues, wherein the network device comprises M counters, and wherein the M counters are in a one-to-one correspondence with the M data streams;
   sending pause indication information to an upper-level controller when a count value on a first counter exceeds a corresponding threshold, wherein the pause indication information instructs the upper-level controller to pause data packet sending, and wherein the first counter is any one of the M counters; and
   calculating a difference between a count value on a second counter and a length of the data packet to obtain an updated count value on the second counter.

13. The method of claim 12, further comprising inserting a to-be-enqueued data packet into a corresponding queue and controlling the first counter to update the count value on the first counter when the count value on the first counter is less than the corresponding threshold.

14. The method of claim 12, further comprising calculating, by the first counter, a weighted average value of the count value on the first counter and a length of a to-be-enqueued data packet to obtain an updated count value on the first counter.

15. The method of claim 12, further comprising:
   scheduling a data packet in any of the N queues; and
   controlling the second counter corresponding to the data packet to update the count value on the second counter.

16. The method of claim 12, wherein the N queues are N input queues and the M data streams are M input data streams, and wherein the method further comprises setting the N input queues based on a plurality of input ports of the network device and a maximum quantity of queues that corresponds to each of the input ports.

17. The method of claim 16, further comprising:
   determining a maximum quantity M of input data streams based on a quantity of users that corresponds to each of the input ports and a maximum quantity of data streams that corresponds to each of the users; and
   grouping input data packets into the M input data streams.

18. The method of claim 12, wherein the N queues are N output queues, wherein the M data streams are M output data streams, and wherein the method further comprising setting the N output queues based on a quantity of lower-level network devices.

19. The method of claim 18, further comprising:
   determining a maximum quantity M of output data streams based on the quantity of lower-level network devices, a maximum quantity of input ports of each of the lower-level network devices, and a maximum quantity of data streams that corresponds to each of the input ports of each of the lower-level network devices; and
   grouping output data packets into the M output data streams.

20. The method of claim 12, wherein the N queues are N input queues, wherein the M data streams are M input data streams.

* * * * *

UNITED STATES PATENT AND TRADEMARK OFFICE
CERTIFICATE OF CORRECTION

PATENT NO. : 11,165,710 B2  
APPLICATION NO. : 16/785990  
DATED : November 2, 2021  
INVENTOR(S) : Hui Lu and Wan Lam Page 1 of 1

It is certified that error appears in the above-identified patent and that said Letters Patent is hereby corrected as shown below:

On the Title Page

Item (30), Foreign Application Priority data: should read "Aug. 10, 2017 (CN) 201710680143.5"

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*